United States Patent
Udagawa et al.

(10) Patent No.: US 7,854,798 B2
(45) Date of Patent: Dec. 21, 2010

(54) INK SET, IMAGE FORMING METHOD, INK JET RECORDING METHOD, INK CARTRIDGE, AND RECORDING UNIT

(75) Inventors: Masako Udagawa, Kawasaki (JP); Hirofumi Ichinose, Tokyo (JP); Kouhei Nakagawa, Kawasaki (JP); Hideki Takayama, Fujisawa (JP); Shinichi Hakamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 11/722,627

(22) PCT Filed: Mar. 10, 2006

(86) PCT No.: PCT/JP2006/305310
§ 371 (c)(1),
(2), (4) Date: Jun. 22, 2007

(87) PCT Pub. No.: WO2006/095930
PCT Pub. Date: Sep. 14, 2006

(65) Prior Publication Data
US 2010/0021633 A1   Jan. 28, 2010

(30) Foreign Application Priority Data
Mar. 11, 2005   (JP) ............... 2005-069839

(51) Int. Cl.
*C09D 11/02*   (2006.01)
*B41J 2/01*   (2006.01)

(52) U.S. Cl. .................... 106/31.6; 347/100

(58) Field of Classification Search ................ 106/31.6; 347/100
See application file for complete search history.

(56) References Cited

U.S. PATENT DOCUMENTS 5,782,967 A   7/1998   Shirota et al. ............ 106/31.58

(Continued)

FOREIGN PATENT DOCUMENTS

CN   1464900   12/2003

(Continued)

OTHER PUBLICATIONS

Mar. 3, 2010 European Search Report in European Patent Application No. 06729300.1.

*Primary Examiner*—Helene Klemanski
(74) *Attorney, Agent, or Firm*—Fitzpatrick, Cella, Harper & Scinto

(57) ABSTRACT

An object of the present invention is to provide an ink set which can produce images with color developability undoubtedly higher than images produced by a conventional pigment ink and closer to images produced by silver halide photography or output from a laser printer, in particular, color developability in a red color region, while keeping ink reliability. The ink set comprises at least a first ink and a second ink wherein the first ink has a maximum absorption wavelength in a region of 450 nm or more and less than 500 nm and the second ink has a maximum absorption wavelength in a region of 500 nm or more and 570 nm or less, and the ink set has a B/A ratio of a minimum absorbance B to a maximum absorbance A of 0.7 or more and 1.0 or less among absorbances of the first ink and the second ink in total in a region of 450 nm or more and 570 nm or less.

7 Claims, 3 Drawing Sheets

U.S. PATENT DOCUMENTS

| | | | |
|---|---|---|---|
| 6,036,307 A | 3/2000 | Hakamada et al. | 347/106 |
| 6,214,963 B1 | 4/2001 | Noguchi et al. | 528/71 |
| 6,398,355 B1 | 6/2002 | Shirota et al. | 347/100 |
| 6,419,733 B1 | 7/2002 | Sano et al. | |
| 6,552,156 B2 | 4/2003 | Noguchi et al. | 528/71 |
| 6,676,254 B2 | 1/2004 | Nagashima et al. | 347/100 |
| 6,698,876 B2 | 3/2004 | Sato et al. | 347/100 |
| 6,824,262 B2 * | 11/2004 | Kubota et al. | 106/31.6 |
| 6,843,840 B2 | 1/2005 | Kataoka et al. | |
| 6,848,781 B2 | 2/2005 | Ogino et al. | 347/105 |
| 6,874,881 B2 | 4/2005 | Suzuki et al. | 347/100 |
| 6,916,862 B2 | 7/2005 | Ota et al. | |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 7,029,109 B2 | 4/2006 | Shirota et al. | 347/100 |
| 7,055,943 B2 | 6/2006 | Suzuki et al. | 347/100 |
| 7,125,111 B2 | 10/2006 | Udagawa et al. | 347/100 |
| 7,141,105 B2 | 11/2006 | Udagawa et al. | 106/31.49 |
| 7,144,449 B2 | 12/2006 | Udagawa et al. | 106/31.15 |
| 7,144,452 B2 | 12/2006 | Takayama et al. | 106/31.52 |
| 7,185,978 B2 | 3/2007 | Nagashima et al. | 347/100 |
| 7,198,664 B2 | 4/2007 | Mafune et al. | 106/31.28 |
| 7,198,665 B2 | 4/2007 | Nakamura et al. | 106/31.52 |
| 7,208,032 B2 | 4/2007 | Hakamada et al. | 106/31.27 |
| 7,247,196 B2 | 7/2007 | Sato et al. | 106/31.52 |
| 7,267,716 B2 | 9/2007 | Nagashima et al. | 106/31.6 |
| 7,276,112 B2 | 10/2007 | Tokuda et al. | 106/31.6 |
| 7,291,214 B2 | 11/2007 | Tsuji et al. | 106/31.8 |
| 7,297,202 B2 | 11/2007 | Ichinose et al. | 106/31.6 |
| 7,297,203 B2 | 11/2007 | Takada et al. | 106/31.8 |
| 7,303,620 B2 | 12/2007 | Nagashima et al. | 106/31.6 |
| 7,384,465 B2 * | 6/2008 | Jackson | 106/31.6 |
| 7,399,351 B2 * | 7/2008 | Jackson et al. | 106/31.6 |
| 7,462,231 B2 * | 12/2008 | Koganehira et al. | 106/31.6 |
| 2004/0239738 A1 | 12/2004 | Watanabe | |
| 2005/0041082 A1 | 2/2005 | Kataoka | |
| 2005/0124726 A1 | 6/2005 | Yatake et al. | |
| 2005/0219341 A1 | 10/2005 | Nito et al. | 347/100 |
| 2006/0007288 A1 | 1/2006 | Takada et al. | 347/100 |
| 2006/0007289 A1 | 1/2006 | Nito et al. | 347/100 |
| 2006/0012657 A1 | 1/2006 | Nagashima et al. | 347/100 |
| 2006/0098067 A1 | 5/2006 | Imai et al. | 347/100 |
| 2006/0098068 A1 | 5/2006 | Hakamada et al. | 347/100 |
| 2006/0103704 A1 | 5/2006 | Hakamada et al. | 347/100 |
| 2006/0135647 A1 | 6/2006 | Ichinose et al. | 523/160 |
| 2006/0234018 A1 | 10/2006 | Nagashima et al. | 428/195.1 |
| 2007/0029522 A1 | 2/2007 | Udagawa et al. | 252/301.16 |
| 2007/0034114 A1 | 2/2007 | Udagawa et al. | 106/31.15 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/160 |
| 2007/0134451 A1 | 6/2007 | Hakamada et al. | 428/32.38 |
| 2007/0148376 A1 | 6/2007 | Tomioka et al. | 428/32.1 |
| 2007/0188572 A1 | 8/2007 | Takayama et al. | 347/100 |
| 2007/0191508 A1 | 8/2007 | Nakagawa et al. | 523/160 |

FOREIGN PATENT DOCUMENTS

| | | |
|---|---|---|
| EP | 1 146 090 A2 | 10/2001 |
| EP | 1 403 334 A1 | 3/2004 |
| EP | 1645604 A2 | 4/2006 |
| JP | 2000-248217 | 9/2000 |
| JP | 2002-020673 | 1/2002 |
| JP | 2004-155826 | 6/2004 |
| WO | WO 99/05230 | 2/1999 |
| WO | WO 02/100959 | 12/2002 |

* cited by examiner

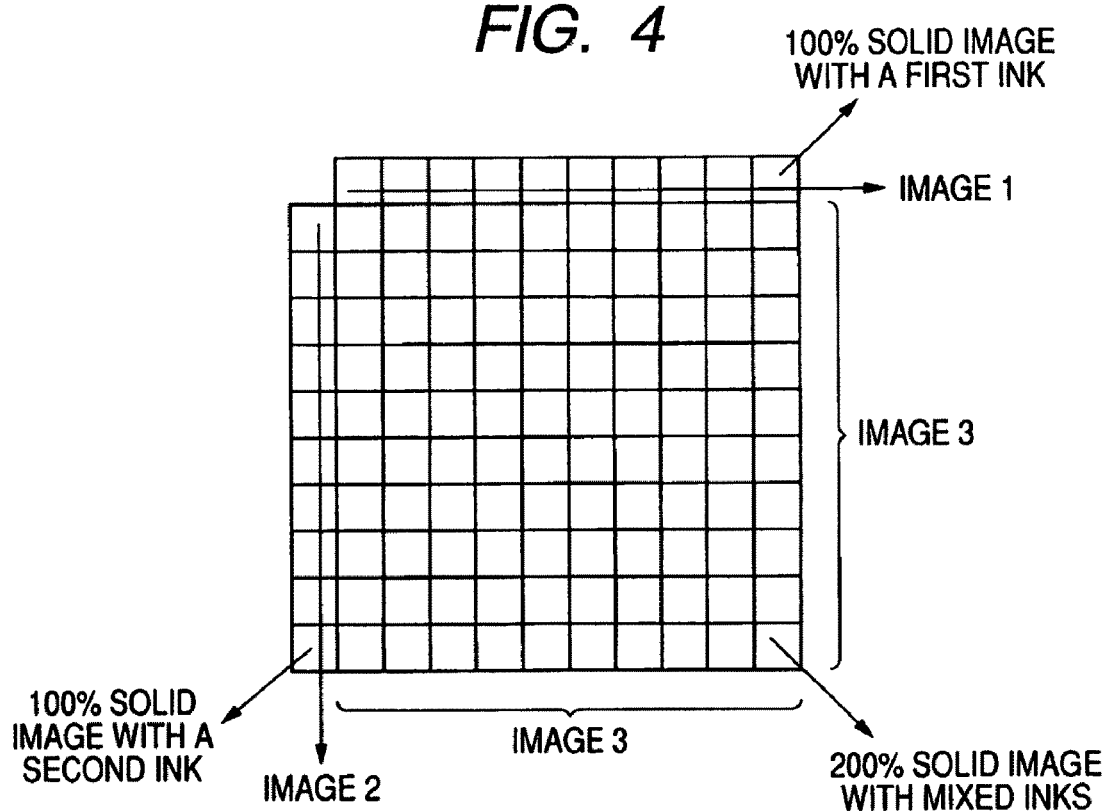

INK SET, IMAGE FORMING METHOD, INK JET RECORDING METHOD, INK CARTRIDGE, AND RECORDING UNIT

BACKGROUND OF THE INVENTION

1. Field of the Invention

The present invention relates to an ink set having at least two inks having specific absorbance characteristics, an image forming method, an ink jet recording method, an ink cartridge and a recording unit.

2. Related Background Art

An ink jet recording method is for forming images by applying ink droplets onto a recording medium, e.g., plain paper or dedicated glossy medium. These methods have been rapidly spreading because of reduced cost and increased printing speed. Color ink jet recording generally forms images with inks of four basic colors, three primary colors (yellow, magenta and cyan) and black.

However, some users sometimes feel that images produced with inks of these three or four colors are not satisfactory in a recorded color region as image quality of printed matter is advancing. In particular, users who demand recorded images having a quality as high as that of images produced by silver halide photography or by a laser printer with powdered toner are demanding recording systems capable of expressing a wider color reproduction range. Under these situations, a number of proposals have been made for forming images with ink colors such as red, green and blue, and further orange, violet and so on in addition to the three basic colors, i.e., three primary colors (yellow, magenta and cyan). See, e.g., WO 99/05230 and Japanese Patent Application Laid-Open No. 2000-248217.

Moreover, there are techniques focused on hue angle are proposed for recording media surface-treated to be glossy to widen a color reproduction range without deteriorating their gloss with a pigment ink (see, e.g., WO 2002/100959 and Japanese Patent Application Laid-Open No. 2004-155826).

These documents, however, simply provide a combination of inks containing coloring materials suitable for the objective hues, and are silent on relationships between coloring materials on recording media. Therefore, these techniques fail to attain a high level beyond expressing colors which satisfy the objects to some extent by, e.g., increasing an ink amount to be applied onto a recording medium or increasing a coloring material content in an ink. With a pigment used as a coloring material, in particular, it will be very difficult to keep ink reliability, with respect to ejection stability, storage stability or the like, as coloring material content increases in an ink. Therefore, images with conventional ink sets, which merely combine inks of different colors for objective image colors, may not be sufficiently satisfactory in some cases depending on hues which these ink sets try to express, compared to images produced by silver halide photography or by a laser printer with powdered toner.

An object of the present invention is to provide an ink set which can produce images with color developability undoubtedly higher than images produced by a conventional pigment ink, and closer to images produced by silver halide photography or output from a laser printer, in particular, color developability in a red color region, while keeping ink reliability.

Other objects are to provide an image forming method, ink jet recording method, ink cartridge and recording unit in which the above ink set is used.

SUMMARY OF INVENTION

These objects can be achieved by the present invention. The ink set of the present invention comprises at least a first ink and a second ink, wherein the first ink has a maximum absorption wavelength in a region of 450 nm or more and less than 500 nm and the second ink has a maximum absorption wavelength in a region of 500 nm or more and 570 nm or less, and the ink set has a B/A ratio of a minimum absorbance B to a maximum absorbance A of 0.7 or more and 1.0 or less among absorbances of the first ink and the second ink in total in a region of 450 nm or more and 570 nm or less.

In a preferred embodiment of the ink set, the first ink and the second ink each comprise a coloring material containing a pigment; the first ink comprises at least C.I. Pigment Red 149 as a coloring material and the second ink comprises at least C.I. Pigment Red 122 as a coloring material; or the second ink has a maximum absorbance X in a region of 520 nm or more and 550 nm or less and a maximum absorbance Y in a region of 550 nm or more and 570 nm or less at a ratio Y/X of 0.9 or more and 1.0 or less.

The image forming method as another aspect of the present invention forms images at least by a first ink and a second ink, wherein the first ink has a maximum absorption wavelength in a region of 450 nm or more and less than 500 nm and the second ink has a maximum absorption wavelength in a region of 500 nm or more and 570 nm or less, and the ink set has a B/A ratio of a minimum absorbance B to a maximum absorbance A of 0.7 or more and 1.0 or less among absorbances of the first ink and the second ink in total in a region of 450 nm or more and 570 nm or less.

The ink jet recording method as still another aspect of the present invention comprises ejecting ink by an ink jet method to carry out recording on a recording medium, wherein the ink constitutes the ink set of the structure described above. The ink cartridge as still another aspect of the present invention comprises an ink storage portion for storing an ink, wherein the ink constitutes the ink set of the structure described above. The recording unit as still another aspect of the present invention comprises an ink storage portion for storing an ink and a recording head for ejecting an ink, wherein the ink constitutes the ink set of the structure described above.

The present invention can bring the following advantages. The images formed with the ink set of the present invention can have wider color developability and color reproduction ranges, in particular color reproduction range in the red color region, and better gradation than those formed with a conventional ink set.

The present invention also provides an image-forming method, ink jet recording method, ink cartridge and recording unit in which the above-described ink set is used.

BRIEF DESCRIPTION OF DRAWINGS

FIG. 4 compares an image formed an ink set prepared in Examples and that formed with a conventional ink set.

DESCRIPTION OF THE PREFERRED EMBODIMENTS

Figure 1A:
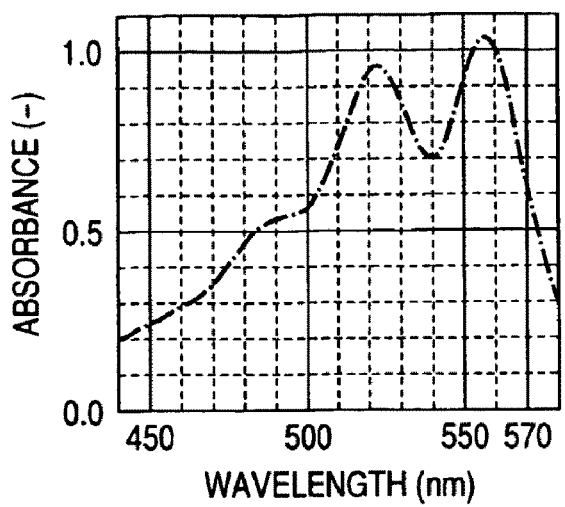
FIGS. 1A, 1B and 1C describe summations of absorbance of a first ink and that of a second ink.

The present invention is described below in detail by the preferred embodiments. The inventors of the present invention have found, after having extensively studied relationships of coloring materials on a recording medium to solve the above problems, combinations of inks which can give recorded matter wide in color reproduction range, in particular that in the red color region, and excellent in gradation, achieving the present invention. Specifically, the ink set of the present invention comprises a first ink having a maximum absorption wavelength in a region of 450 nm or more and less than 500 nm and a second ink having a maximum absorption wavelength in a region of 500 nm or more and 570 nm or less. The advantage of the present invention is realized when the ink set has a B/A ratio of a minimum absorbance B to a maximum absorbance A of 0.7 or more and 1.0 or less among absorbances of the first ink and the second ink in total in a region of 450 nm or more and 570 nm or less.

Use of the ink set of the present invention comprising a first and second inks, the former having a maximum absorption wavelength in a region of 450 nm or more and less than 500 nm and the latter of 500 nm or more and 570 nm or less, realizes images of wider color reproduction range, in particular that in the red color region, than images formed with a conventional ink set. The inventors of the present invention consider that this advantage comes from the following phenomenon. The ink set of the above structure can secure more intensified interference of light after it is reflected onto a recording medium than an ink set lacking a maximum absorption wavelength in each region, to improve color developability in a region of 450 nm or more and 570 nm or less.

It is also considered that the following advantages can be brought by setting a B/A ratio at 0.7 or more and 1.0 or less where A is a maximum summed absorbance of these inks and B is a minimum summed absorbance of these inks, both in a region of 450 nm or more and 570 nm or less. The ink set can improve uniformity of light absorption in an entire region of 450 nm or more and 570 nm or less to intensify light interference. As the B/A ratio comes closer to 1.0, the above effect is more noted, and so are the above-described advantage of the present invention. At a ratio below 0.7, on the other hand, the light interference turns down, because of an excessive difference between maximum summed absorbance A and minimum summed absorbance B, to cause insufficient light development.

"Absorbances of the first ink and the second ink in total" for the present invention is described below. First, each of the first and second inks is diluted with water to the same extent. Each of the diluted inks is analyzed for an absorption spectrum by which absorbance at each wavelength is found, and the absorbance levels at different wavelengths are added up to find a summed absorption spectrum. The summed absorption spectrum gives the maximum summed absorbance A and minimum summed absorbance B, and hence B/A ratio in a region of 450 nm or more and 570 nm or less.

There is a proportional relationship between ink dilution rate and absorbance. It is therefore important to set the same dilution rate for these inks, when the absorbance ratio is found for the present invention. This is to cancel out changed absorbance resulting from dilution of each ink. A wavelength at which absorbance attains a maximum is irrespective of dilution rate, although the absorbance is changed in proportion to the degree of dilution as described above.

Figure 1B:
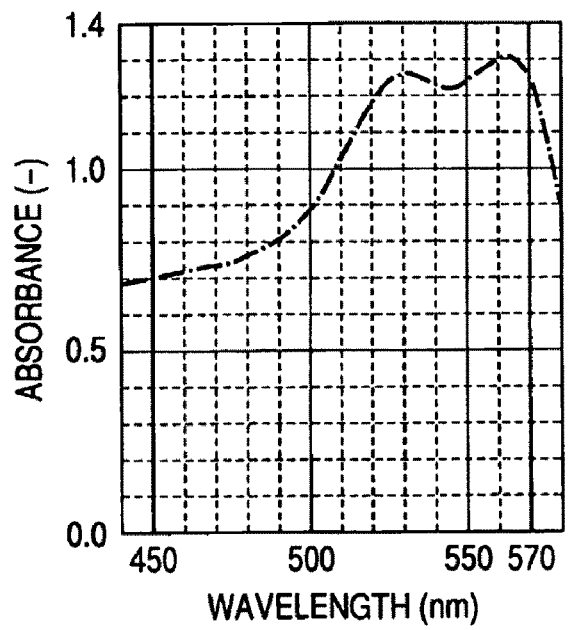
Figure 1C:
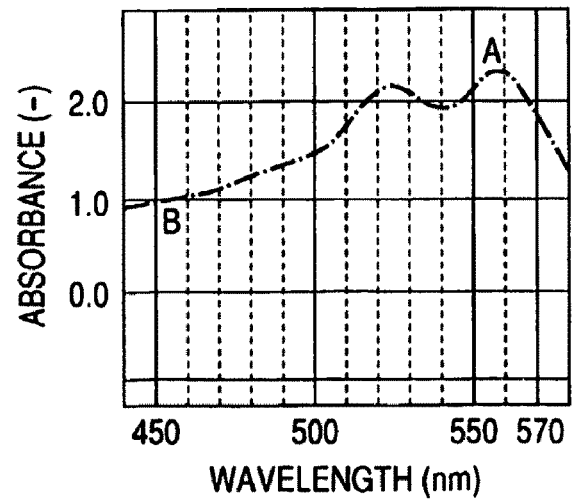

A conventional ink set is then described by taking as an example the ink set prepared in Comparative Example 4, described later. The first ink which constitutes the ink set of Comparative Example 4 is diluted 1,000 times with pure water, to obtain an absorption spectrum, shown in FIG. 1A. Similarly, the second ink for the ink set is diluted also 1,000 times with pure water, to obtain an absorption spectrum shown in FIG. 1B. These spectrums of the first and second inks are used to sum up the absorbance values at each wavelength, to obtain the absorption spectrum with the summed absorbance values, shown in FIG. 1C. The summed absorbance spectrum shown in FIG. 1C gives the following values, wavelength at which absorbance attains a maximum: around 560 nm, maximum absorbance A: 2.40, wavelength at which absorbance attains a minimum: around 450 nm, minimum absorbance B: 1.00, and B/A ratio: 0.42 in a region of 450 nm or more and 570 nm or less.

As discussed above, it is important in the present invention to fully understand ink absorption characteristics to realize color developability in the red region as far as possible. Therefore, the present invention tries to keep light absorption power more uniform while taking into consideration light absorption balance in a region of 450 nm or more and 570 nm or less. In other words, the ink set of the present invention can have a much higher color developability capability in the red color region than conventional ones, e.g., those which merely use an ink containing C.I. Pigment Red 149 and another ink containing C.I. Pigment Red 122 to form color images, and those which place no consideration about absorption characteristics of each ink constituting the ink set except specifying an absorption area of each ink in a specific wavelength range (e.g., the one disclosed in WO 2002/100959).

As discussed above, the present invention takes a wavelength at which absorbance attains a maximum in a region of 450 nm or more and 570 nm or less as a standard for further improving color developability, because light in this range is generally recognized as red color and it is necessary to maximize absorbance in this range. The term "red color region" used in this specification corresponds to a hue angle (H°) value, in the ab calorimetric system specified by CIE, from 0 to 80° and from 330 to 360°.

The present invention, which uses the ink set comprising at least two inks satisfying the above structure, brings another advantage of forming images of higher gradation than a method which uses a conventional ink set. Although not fully substantiated, this conceivably comes from uniformized absorption of light in a region of 450 nm or more and 570 nm or less with the result that there is no region of extremely deviated light absorption power in the above range. This, in turn, can minimize deviation of hue angle (H°) occurring region by region of different ink density.

Moreover, the present invention can realize a much wider color reproduction range in the red color region for images which it produces, when it uses a coloring material containing a pigment for the ink set, than a conventional technique which uses an ink set containing a conventional pigment. The inventors of the present invention have found that a color reproduction range in each color region can be notably expanded, when the ink set according to the present invention contains at least C.I. Pigment Red 149 as a coloring material for the first ink and at least C.I. Pigment Red 122 as a coloring material for the second ink, compared to that of images formed with a combination of inks each containing a conventional pigment.

In particular, it is preferable for the present invention to use a second ink containing C.I. Pigment Red 122 as a coloring material and set a Y/X ratio of the ink at 0.9 or more and 1.0 or less where X is a maximum absorbance in a region of 520 nm or more and 550 nm or less and Y is a maximum absorbance in a region of 550 nm or more and 570 nm or less. The ink set can further improve color developability in the red color region as one of the objects of the present invention, when it comprises the second ink described above. The inventors of the present invention consider that the above advantage comes from the following phenomenon, which although not fully substantiated.

C.I. Pigment Red 122 has two absorption peaks in a region of 380 nm or more and 780 nm or less. It is found that C.I. Pigment Red 122 has pigment particles finely divided under a strengthened dispersion condition, which is accompanied by increased Y/X ratio. It is also found that color developability improves as they become finer. The inventors of the present invention have attempted to strengthen dispersion conditions by changing, e.g., dispersion methods by a roll mill, beads mill and nanomizer, dispersion time and circumferential velocity, types of media to be filled and kinds of pigment to find that excessive dispersion of pigment particles tends to shift color gradation to a blue color region and deteriorate dispersion stability. They have concluded, based on these findings, that it is preferable to use C.I. Pigment Red 122, which secures a Y/X ratio at 0.9 or more and 1.0 or less for a second ink coloring material, in order to realize an improved color developability in the red color region and dispersion stability of pigment.

Moreover, the inventors of the present invention have found that it is preferable to keep the following conditions, when a coloring material for the first ink comprises at least C.I. Pigment Red 149 and coloring material for the second ink comprises at least C.I. Pigment Red 122. It is particularly preferable to keep a WM/WR ratio at 0.88 or more and 1.25 or less where WM is a C.I. Pigment Red 122 content (mass %) in the second ink and WR is a C.I. Pigment Red 149 content (mass %) in the first ink. At a WM/WR ratio below 0.88, C.I. Pigment Red 122 itself is required to have a fairly high color developability in order to secure color developability in the red color region. As discussed above, color developability of C.I. Pigment Red 122 itself can be enhanced to some extent by finely dividing the pigment particles. Nevertheless, it is preferable to keep a WM/WR ratio at 0.88 or more in consideration that dispersion stability of the particles decreases as their size decreases. On the other hand, color developability in the red color region is not notably improved as a WM/WR ratio increases beyond 1.25, as compared to that at a ratio below 1.25. It is preferable to keep a ratio at 1.25 or less, because increasing a coloring material content in the ink beyond necessity is undesirable in consideration of reliability or the like with respect to ink jet characteristics or the like.

Another preferred embodiment of the present invention contains C.I. Pigment Red 149 in a first ink preferably at 3.0 mass % or more and 5.0 mass % or less, with respect to the total mass of the ink. Keeping the content in the above range can realize excellent color developability, even when the ink application amount is low. C.I. Pigment Red 149 has a higher color developability than other common organic pigments, and may exert adverse effects on ink storage stability and the like while contributing to improvement of color developability to a limited extent, when it is contained at above 5.0 mass %. At below 3 mass %, on the other hand, in order to secure sufficient color developability, the ink will be injected onto a recording medium in a quantity which may cause problems, e.g., deteriorated fixation, even though it has a higher color developability than other common organic pigments.

Still another preferred embodiment of the present invention contains C.I. Pigment Red 122 in a second ink at 2.6 mass % or more, preferably 3.7 mass % or more as lower limit, and 6.3 mass % or less, preferably 4.4 mass % or less as upper limit, all percentages by mass with respect to the total mass of the ink.

The inventors of the present invention have further investigated to observe improved gloss of images formed with the ink which constitutes the ink set of the present invention on a recording medium having an ink receiving layer mainly composed of an inorganic pigment. It is another advantage brought by use of the coloring material, described above. They attribute the above advantage to the following phenomenon.

For example, C.I. Pigment Red 149, which can be suitably used for the present invention, has a characteristic of having a higher absorption intensity in a H° range of 30 or more and 80 or less, the most important range for forming a red color region on a recording medium, than other coloring materials. Therefore, an ink containing C.I. Pigment Red 149 as a coloring material can provide images of sufficient color developability in the above H° range even in a reduced ink application amount, and hence in a reduced quantity of the coloring material on a recording medium. Pigment particles generally agglomerate each other on a glossy recording medium to randomly scatter light, which is one of the causes for deteriorated gloss of the images. It is therefore considered that the ink which constitutes the ink set of the present invention provides more glossy images than a conventional ink, because it contains C.I. Pigment Red 149 of high color developability capability.

(Ink Set)

It is essential for the ink set of the present invention to comprise at least two inks, first and second, the former having a maximum absorption wavelength in a region of 450 nm or more and less than 500 nm and the latter having a maximum absorption wavelength in a region of 500 nm or more and 570 nm or less. It is also essential to have a B/A ratio of 0.7 or more and 1.0 or less where A is a maximum summed absorbance of these inks and B is a minimum summed absorbance of these inks, both in a region of 450 nm or more and 570 nm or less. These first and second inks may be similar to known ones in structure or an other ink for use for a combination of these inks except for the above-described essential features. An aqueous ink, known for its ink jet recording characteristics, is a particularly preferable embodiment of the ink which constitutes the ink set of the present invention. Each component to be used for producing each ink which constitutes the ink set of the present invention is described below.

(Coloring Materials)

Each coloring material for each ink which constitutes the ink set of the present invention is described. There are various inks, e.g., those with a pigment to which an anionic dye or anionic group is chemically bound on the surface, dissolved or dispersed in an aqueous medium; or those with a pigment as a coloring material and anionic dispersing agent in an aqueous medium. Any of these inks can be used for the present invention. However, an ink type containing a pigment as a coloring material to constitute the ink set is particularly preferable, because it helps notably exhibit the advantages of the present invention. In other words, a pigment, although inferior to a dye in color developability, can fully bring out color developability of a coloring material for images, when it constitutes the ink set of the present invention, as discussed earlier. Pigments useful for the present invention include common pigments, microencapsulated pigments, colored resin, and so on. A coloring material is contained in each ink which constitutes the ink set of the present invention preferably at 2.0 mass % or more and 6.0 mass % or less with respect to the total mass of the ink in consideration of ink reliability, image color developability and so on. These coloring materials are described below in detail.

(Pigments)

The ink set of the present invention is premised on comprising a coloring material having a maximum absorption wavelength in a region of 450 nm or more and less than 500 nm and another coloring material having a maximum absorption wavelength in a region of 500 nm or more and 570 nm or less at least in respective first and second inks which constitute the ink set. This structure allows the ink to have a maximum absorption wavelength in the region specified for the present invention. The pigments useful for the present invention and having a maximum absorption wavelength in a region of 450 nm or more and less than 500 nm include C.I. Pigment Red 149, and C.I. Pigment Orange 34 and 71. Those having a maximum absorption wavelength in a region of 500 nm or more and 570 nm or less include C.I. Pigment Red 122 and 177, and Pigment Violet 19.

Coloring materials which can be used for an ink, except the above, for constituting the ink set of the present invention or for use in combination with the coloring material described above are not limited. The pigment for the present invention may be selected from carbon black, organic pigments and the like, described below.

(Carbon Black)

Carbon black pigments can be selected from furnace black, lamp black, acetylene black, channel black and so on.

Specifically, they include Raven: 1170, 1190ULTRA-II, 1200, 1250, 1255, 1500, 2000, 3500, 5000, 5250, 5750 and 7000 (all by Columbia); Black Pearls L, Regal: 330R, 400R and 660R, Mogul L, Monarch: 700, 800, 880, 900, 1000, 1100, 1300 and 1400, and Valcan XC-72R (all by Cabot); Color Black; FW1, FW2, FW2V, FW18, FW200, S150, S160 and S170, Printex: 35, U, V, 140U and 140V, and Special Black: 4, 4A, 5 and 6 (all by Degussa); and No. 25, No. 33, No. 40, No. 47, No. 52, No. 900, No. 2300, MCF-88, MA600, MA7, MA8 and MA100 (all by Mitsubishi Chemical).

Carbon black pigments useful for the present invention are not limited above, and known ones can be used. Moreover, fine magnetic particles, e.g., those of magnetite and ferrite, and titanium black may be used as black pigments.

(Organic Pigments)

Specifically, organic pigments useful for the present invention include:

Insoluble azo pigments; e.g., Toluidine Red, Toluidine Maroon, Hanza Yellow, Benzidine Yellow and Pyrazolone Red; water-soluble azo pigments, e.g., Ritohl Red, Heliobordeau, Pigment Scarlet and Permanent Red 2B; vat dye derivatives, e.g., arizarine, indanthrone and thioindigo maroon; phthalocyanine-based pigments, e.g., Phthalocyanine Blue and Phthalocyanine Green; quinacridone-based pigments, e.g., Quinacridone Red and Quinacridone Magenta; perylene-based pigments, e.g., Perylene Red and Perylene Scarlet; Isoindolinone-based pigments, e.g., Isoindolinone Yellow and Isoindolinone Orange; Imidazolone-based pigments, e.g., Benzimidazolone Yellow, Benzimidazolone Orange and Benzimidazolone Red; Pyranthrone-based pigments, e.g., Pyranthrone Red and Pyranthrone Orange; indigo-based pigments, condensed azo pigments, indigo-based pigments, Flavanthrone Yellow, Acyl Amide Yellow, Quinophthalone Yellow, Nickel Azo Yellow, Copper Azomethyne Yellow, Perinone Orange, Anthrone orange, Dianthraquinonyl Red, Dioxadine Violet, and so on.

Moreover, organic pigments in terms of Color Index (C.I.) number include:

C.I. Pigment Yellow: 12, 13, 14, 17, 20, 24, 74, 83, 86, 93, 109, 110, 117, 120, 125, 128, 137, 138, 147, 148, 151, 153, 154, 166, 168 and so on;

C.I. Pigment Orange: 16, 36, 43, 51, 55, 59, 61, 71 and so on;

C.I. Pigment Red: 9, 48, 49, 52, 53, 57, 97, 122, 123, 149, 168, 175, 176, 177, 180, 192, 215, 216, 217, 220, 223, 224, 226, 227, 228, 238, 240 and so on;

C.I. Pigment Violet: 19, 23, 29, 30, 37, 40, 50 and so on;

C.I. Pigment Blue: 15, 15:1, 15:3, 15:4, 15:6, 22, 60, 64 and so on;

C.I. Pigment Green: 7, 36 and so on; and

C.I. Pigment Brown: 23, 25, 26 and so on.

Coloring materials for each ink which constitutes the ink set of the present invention are not limited to the above, and can be selected from known ones. The preferable ink combination containing the above organic pigments for widening color reproduction ranges other than the red color region which the present invention intends to expand is an yellow ink containing C.I. Pigment Yellow 74, magenta ink containing C.I. Pigment Red 122, red ink containing C.I. Pigment Red 149, cyan ink containing C.I. Pigment blue 15:3, green ink containing C.I. Pigment Green 7, and blue ink containing C.I. Pigment violet 23. The above combination brings particularly excellent effects when used to form images.

(Dispersing Agents)

The above carbon black and organic pigments, when used for the present invention, are preferably incorporated in combination with a dispersing agent. The dispersing agent is preferably selected from those which can stably disperse the above coloring material in an aqueous medium by the action of an anionic group. It preferably has a weight-average molecular weight in a region of 1,000 or more and 30,000 or less, particularly preferably 3,000 or more and 15,000 or less.

Specifically, dispersing agents useful for the present invention include styrene/acrylic acid copolymer, styrene/acrylic acid/alkyl acrylate ester copolymer, styrene/maleic acid copolymer, styrene/maleic acid/alkyl acrylate ester copolymer, styrene/methacrylic acid copolymer, styrene/methacrylic acid/alkyl acrylate ester copolymer, styrene/maleic acid half ester copolymer, vinyl naphthalene/acrylic acid copolymer, vinyl naphthalene/maleic acid copolymer and styrene/maleic acid anhydride/maleic acid half ester copolymer or salts thereof.

(Self-Dispersible Pigments)

Each ink which constitutes the ink set of the present invention can contain a so-called self-dispersible pigment, as a coloring material. It has an ionic (anionic) group bound to the surface, which allows the pigment to be dispersed in an aqueous medium without using dispersing agent. These pigments include self-dispersible carbon black, for example. Carbon black having an anionic group bound to the surface, i.e., anionic carbon black, is one example of self-dispersible carbon black.

(Fine Colored Particles/Microencapsulated Pigments)

Other pigments can be also used as coloring materials for each ink which constitutes the ink set of the present invention. These include pigments microencapsulated with a polymer or the like, or fine colored particles obtained by coating resin particles with a coloring material. Microcapsules are inherently dispersible in an aqueous medium, but may be incorporated in an ink in combination with a dispersing agent, e.g., that selected from the ones described above, to enhance dispersion stability. Fine, colored particles, when used as a coloring material, are preferably incorporated in the presence of an anionic dispersing agent described above or the like.

(Dyes)

Each ink which constitutes the ink set of the present invention can contain an anionic dye as a coloring material. The anionic dyes useful for the present invention include:

(Coloring Materials for Yellow Ink)

C.I. Direct Yellow: 8, 11, 12, 27, 28, 33, 39, 44, 50, 58, 85, 86, 87, 88, 89, 98, 100, 110, 132 and so on;

C.I. Acid Yellow: 1, 3, 7, 11, 17, 23, 25, 29, 36, 38, 40, 42, 44, 76, 98, 99 and so on;

C.I. Reactive Yellow: 2, 3, 17, 25, 37, 42 and so on; and

C.I. Food yellow: 3 and so on;

(Coloring Materials for Red Ink)

C. I. Direct Red: 2, 4, 9, 11, 20, 23, 24, 31, 39, 46, 62, 75, 79, 80, 83, 89, 95, 197, 201, 218, 220, 224, 225, 226, 227, 338, 339, 230 and so on;

C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289 and so on;

C.I. Reactive Red: 7, 12, 13, 15, 17, 20, 23, 24, 31, 42, 45, 46, 59 and so on; and C.I. Food Red: 87, 92, 94 and so on;

(Coloring Materials for Blue Ink)

C. I. Direct Blue: 1, 15, 22, 25, 41, 76, 77, 80, 86, 90, 98, 106, 108, 120, 158, 163, 168, 199, 226 and so on;

C. I. Acid Blue: 1, 7, 9, 15, 22, 23, 25, 29, 40, 43, 59, 62, 74, 78, 80, 90, 100, 102, 104, 117, 127, 138, 158, 161 and so on;

C.I. Reactive Blue: 4, 5, 7, 13, 14, 15, 18, 19, 21, 26, 27, 29, 32, 38, 40, 44, 100 and so on; and (Coloring Materials for Black Ink)

C. I. Direct Black: 17, 19, 22, 31, 32, 51, 62, 71, 74, 112, 113, 154, 168, 195 and so on;

C.I. Acid Black: 2, 48, 51, 52, 110, 115, 156 and so on; and

C.I. Food Black: 1, 2 and so on.

(Aqueous Medium)

An ink which constitutes the ink set of the present invention preferably contains a pigment and/or dye, e.g., that described above, dispersed or dissolved in an aqueous medium. The aqueous medium useful for the present invention preferably comprise water or water and a water-soluble organic solvent.

Each ink which constitutes the ink set of the present invention is preferably incorporated with a water-soluble organic solvent at 3.0 mass % or more and 50.0 mass % or less with respect to the total mass of the ink. Specifically, water-soluble organic solution useful for the present invention include: alkanols of 1 to 4 carbon atoms, e.g., ethanol, isopropanol, n-butanol, isobutanol, secondary butanol and tertiary butanol; carboxylic acid amides, e.g., N,N-dimethylformamide and N,N-dimethylacetoamide; ketones, e.g., acetone, methylethylketone and 2-methyl-2-hydroxypentan-4-one; cycloethers, e.g., ketoalcohol, tetrahydrofuran and dioxane; polyhydric alcohols, e.g., glycerin, ethyleneglycol, diethyleneglycol, triethyleneglycol, tetraethyleneglycol, 1,2-propyleneglycol, 1,3-propyleneglycol, 1,2-butyleneglycol, 1,4-butyleneglycol, polyethyleneglycol, 1,3-butanediol, 1,5-pentanediol, 1,2-hexanediol, 1,6-hexanediol, dithioglycol, 2-methyl-1,3-propanediol, 1,2,6-hexanetriol, acetyleneglycol derivative and trimethylolpropane; alkyl ethers of polyhydric alcohol, e.g., ethyleneglycolmonomethyl ether, ethyleneglycolmonoethyl ether, diethyleneglycolmonomethyl ether, diethyleneglycolmonoethyl ether, triethyleneglycolmonoethyl ether and triethyleneglycolmonobutyl ether; heterocyclic compounds, e.g., 2-pyrrolidone, N-methyl-2-pyrrolidone, 1,3-dimethyl-2-imidazolidinone and N-methylmorpholine; sulfur-containing compounds, e.g., dimethyl sulfoxide; and urea and its derivative.

Water for the aqueous medium is preferably de-ionized (ion-exchanged). Each ink which constitutes the ink set of the present invention is incorporated with water preferably at 50.0 mass % or more and 90.0 mass % or less with respect to the total mass of the ink, in order to have an adequate viscosity for stable injection and, at the same time, to prevent clogging at the nozzle tip.

Moreover, an ink which constitutes the ink set of the present invention particularly preferably contains an aqueous organic solvent working as a poor medium for a pigment, when it is used as a coloring material. Such an ink will further improve color developability capability of the pigment, because it will accelerate fixation of the pigment as a coloring material in the vicinity of recording medium surface.

A poor medium used in this specification is defined as a water-soluble organic solvent which is low in dispersion stability for pigment dispersion solution. Specifically, the dispersion stability for the pigment of the water-soluble organic solvents is tested as described below. A pigment dispersion solution which contains about 50 mass % of a water-soluble organic solvent to be tested and pigment in a dispersed condition is prepared. The obtained pigment dispersion solution is allowed to stand at 60° C. for 48 hours to observe average particle size of the pigment in the dispersion. Then, the state of the pigment is investigated before and after the storage of the pigment dispersion solution. The solvent is defined as a poor medium when it is larger than that of the pigment dispersed in an aqueous solvent in which the water-soluble organic solvent to be tested is not contained or contained to only a limited extent.

(Additives)

Each ink which constitutes the ink set of the present invention may be incorporated with one or more additives, in addition to the components described above. These additives can be selected from various ones, e.g., surfactant, pH adjusting agent, chelating agent, rust-proof agent, preservative, biocides, UV absorber, viscosity adjusting agent, defoaming agent and water-soluble polymer.

(Surfactants)

Surfactants for the present invention may be anionic surfactant, ampholytic surfactant, cationic surfactant or nonionic surfactant.

Specifically, anionic surfactants useful for the present invention include alkyl sulfocarbonate, α-olefin sulfonate, polyoxyethylene alkyl ether acetate, N-acylamino acid and salts thereof, N-acylmethyl taurate, alkyl sulfate polyoxy alkyl ether sulfate, alkyl sulfate polyoxyethylene alkyl ether phosphate, rosin acid soap, castor oil sulfate, lauryl alcohol sulfate, alkyl phenol type phosphoric ester, alkyl type phosphoric ester, alkyl allyl sulfonate, diethyl sulfosuccinate, diethylhexyl sulfosuccinate and dioctyl sulfosuccinate.

Specifically, cationic surfactants useful for the present invention include 2-vinyl pyridine derivatives and poly-4-vinyl pyridine derivatives.

Specifically, ampholytic surfactants useful for the present invention include lauryl dimethyl aminoacetic acid betaine, 2-alkyl-N-carboxymethyl-N-hydroxyethylimidazolinium betaine, coconut oil fatty acid amide propyldimethyl aminoacetic acid betaine, polyoctylpolyaminoethyl glycine, and other imidazoline derivatives.

Specifically, nonionic surfactants useful for the present invention include:

ether-based ones, e.g., polyoxyethylenenonylphenyl ether, polyoxyethyleneoctylphenyl ether, polyoxyethylenedodecylphenyl ether, polyoxyethylenelauryl ether, polyoxyethyleneoleyl ether, polyoxyethylene alkyl ether and polyoxyethylenealkyl alkyl ether; ester-based ones, e.g., polyoxyethyleneoleic acid, polyoxyethyleneoleic acid ester, polyoxyethylenedistearic acid ester, sorbitan laurate, sorbitan monostearate, sorbitan monooleate, sorbitan sesqui oleate, polyoxyethylene monooleate and polyoxyethylene stearate; acetylene glycol-based ones, e.g., 2,4,7,9-tetramethyl-5-decine-4,7-diol, 3,6-dimethyl-4-octine-3,6-diol and 3,5-dimethyl-1-hexin-3-ol. The commercial product of the acetylene glycol based surfactant is, for example, Acetylenol E100 by Kawaken Fine Chemicals; and Surfynol 104, 82 and 465, and Olfin STG by Nisshin Chemical Industry.

(PH Adjusting Agents)

Any pH adjusting agent may be used so long as it can control an ink pH level in a specified range. Specifically, pH adjusting agents useful for the present invention include: alcohol amine compounds, e.g., diethanolamine, triethanolamine, isopropanolamine and trishydroxymethylaminomethane; alkali metal hydroxides, e.g., lithium hydroxide and potassium hydroxide; ammonium hydroxide; and alkali metal carbonates, e.g., lithium carbonate, sodium carbonate and potassium carbonate.

(Preservatives and Biocides)

Specifically, preservatives and biocides useful for the present invention include: compounds based on organic sulfur, organic nitrogen/sulfur, organohalogens, haloallylsulfone, iodopropargyl, N-haloalkylthio, benzthiazole, nitrile, pyridine, 8-oxyquinoline, benzothiazole, isothiazoline, dithiol, pyridine oxide, nitropropane, organic tin, phenol, quarternary ammonium salts, triazine, thiadiazine, anilide, adamantane, dithiocarbamate, brominated indanone, benzylbromoacetate and inorganic salts.

Organohalogen-based compounds include pentachlorophenol sodium, pyridine oxide-based compounds include 2-pyridinethiol-1-oxide sodium, those based on inorganic salts include sodium acetate anhydride and isothiazoline-based compounds include 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride and 5-chloro-2-methyl-4-isothiazolin-3-one calcium chloride. Other preservatives and biocides include sorbic acid sodium and benzoic acid sodium, e.g., Proxel GXL (S) and Proxel XL-2 (S) by Avecia.

(Chelating Agents)

Specifically, chelating agents useful for the present invention include sodium citrate, sodium ethylenediamine tetraacetate, sodium 2-nitrotriacetate, sodium hydroxyethylethylenediamine triacetate, sodium diethylenetriamine pentaacetate and sodium uranyl diacetate.

(Rust Preventives)

Specifically, rust preventives useful for the present invention include acidic sulfites, sodium thiosulfate, ammonium thioglycolate, diisopropyl ammonium nitrite, pentaerythritol tetranitrite and dicyclohexyl ammonium nitrite.

(UV Absorbers)

Specifically, UV absorbers useful for the present invention include compounds which absorb ultraviolet ray to emit fluorescence (so-called fluorescent whitening agents). They are represented by those based on benzophenone, benzotriazole, cinnamic acid, triazine, stilbene and benzoxazole.

(Viscosity Adjusting Agents and Defoaming Agents)

Viscosity adjusting agents include water-soluble polymers, in addition to water-soluble organic solvents. Specifically, they include polyvinyl alcohol, cellulose derivative, polyamine and polyimine.

As for defoaming agents, fluorine- or silicone-based compound is used, as required.

(Ink Set Types)

The ink set of the present invention comprises at least two ink types which satisfy the conditions specified by the present invention, and may contain any other ink. All of the ink sets described below are within the scope of the present invention, and are referred to as the "ink sets."

An ink set comprising a cyan, magenta, yellow and black inks as the basic inks, and an ink selected from the group consisting of red, green and blue inks, each stored in a cartridge.

An ink set comprising a cyan, magenta and yellow inks as the basic inks, and an ink of another color, integrated in a cartridge.

An ink set, wherein an ink tank is formed by an ink cartridge with a head.

An ink set, wherein the ink tank comprises ink cartridge respectively detachable from a recording device.

Type of an ink, other than the essential two ink types used in combination for the ink set of the present invention, is not limited to the above, and any variation can be adopted in a recording device or cartridge.

(Ink Jet Recording Method)

The ink set of the present invention produces particularly good results when used for an ink jet recording method, in which an ink is ejected from an orifice in accordance with a recording signal onto a recording medium to form images thereon. One of the preferred ink jet recording methods ejects an ink by applying thermal energy to the ink onto a recording medium to form images thereon.

(Ink Cartridge)

The ink set of the present invention is preferably used with a plurality of the constituent inks individually held by cartridges. One type of the ink cartridges within the scope of the present invention has an ink storage portion for each of the inks for the ink set of the present invention. One embodiment of the ink cartridge suitable for recording with the ink set of the present invention is specifically described.

Figure 2:
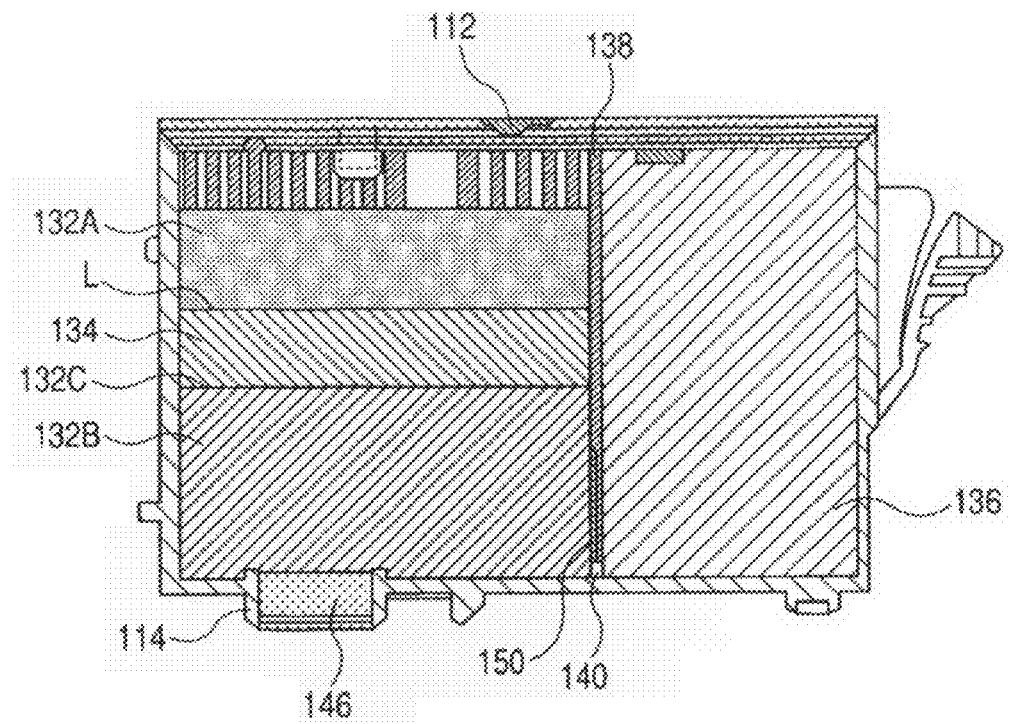
FIG. 2 is an outlines of an ink cartridge.

FIG. 2 is a cross-sectional view outlining a liquid-storing container suitably used for an ink cartridge for recording with the ink set of the present invention. As illustrated, the liquid-storing container (ink tank) is in communication with air via the air communication port 112 on the top, and with an ink supply port at the bottom. The liquid-storing container contains a negative pressure generation member-holding chamber 134 for holding a negative pressure generation member and a liquid-holding chamber 136 essentially closed to store a liquid ink, separated from each other by the partition wall 138. The negative pressure generation member-holding chamber 134 and liquid-holding chamber 136 are in communication with each other only through the communication hole 140 and air inducing groove (air inducing passage) 150, the former being provided in the partition wall 138 at near the bottom of the liquid-storing container (ink tank) and the latter being provided to accelerate drawing air into the liquid-storing container during supply of liquid. The liquid-storing container (ink tank), which contains the negative pressure generation member-holding chamber 134 for holding a negative pressure generation member, is provided on the upper wall with a plurality of ribs integrated with the liquid-storing container. These ribs project inwards to come into contact with the negative pressure generation member contained in the negative pressure generation member-holding chamber 134 in a compressed condition. They form an air buffer chamber between the upper wall and upper side of the negative pressure generation member.

The ink supply cylinder having the liquid supply port 114 is provided with the compressing member 146, which has a higher capillary force and physical strength than the negative pressure generation member, and comes into contact with the negative pressure generation member under pressure. In the embodiment illustrated in FIG. 2, the negative pressure generation member-holding chamber 134 contains two types of capillary force generation type negative pressure generation members, first member 132B and second member 132A, made of polyolefin-based resin (e.g., polyethylene) fibers. These members 132A and 132B are separated by the boundary layer 132C, whose portion intersecting with the partition wall 138 is positioned at above the upper side of the air inducing groove (air inducing passage) 150, when the groove 150 is provided at the bottom of the liquid-storing container. The liquid level L of the ink contained in the negative pressure generation member is above the boundary layer 132C, as illustrated.

(Recording Unit)

Figure 3:
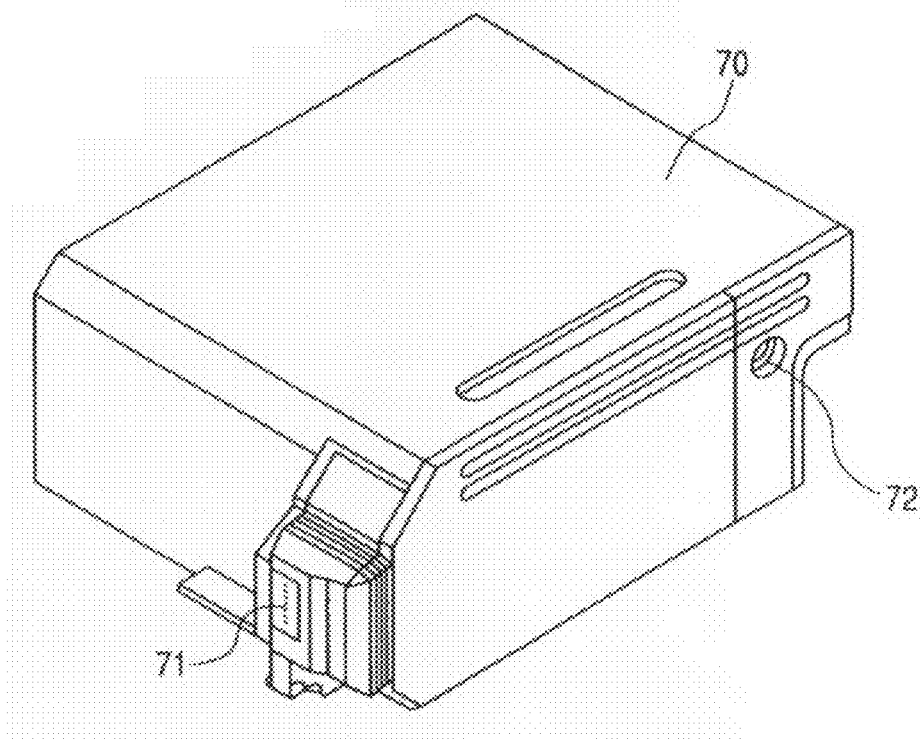
FIG. 3 is a perspective view illustrating one example of recording unit.

The recording unit of the present invention is provided with the ink storage portion and ink jet head described above, the former for holding each of a plurality of the inks which constitute the ink set of the present invention and the latter ejecting each of the inks. The head and ink cartridge are separated from each other in the above structure, but may be integrated with each other as illustrated in FIG. 3. Both of these structures are suitably used for the present invention. Referring to FIG. 3, the recording unit 70 contains an ink storage portion (e.g., ink absorber) for storing an ink. Each ink in the ink absorber is ejected in droplets from the head 71 provided with a plurality of orifices. The ink absorber is preferably made of polyurethane or polypropylene. The ink storage portion may be of a structure with an ink bag having a spring or the like inside while dispensing with an ink absorber. The member 72 is an air communication port, through which the ink cartridge inside is in communication with air.

EXAMPLES

Hereinafter, the present invention will be described more specifically by way of examples and comparative examples. The present invention is not limited to the following examples without departing from the gist of the present invention. The terms "part(s)" and "%" in the following description are on a mass basis unless otherwise stated.

(Preparation of Pigment Dispersion Solutions 1 to 9)

The pigment dispersion solutions 1 to 9 were prepared by the following procedures, where a dispersing agent was an aqueous solution of a styrene/acrylic acid copolymer having an acid value of 200 and weight-average molecular weight of 10,000, neutralized with a 10 mass % aqueous solution of sodium hydroxide.

(Preparation of Pigment Dispersion Solution 1 Containing C.I. Pigment Red 122)

10 parts of C.I. Pigment Red 122 as a pigment, 20 parts of a dispersing agent and 70 parts of ion exchange water were mixed and dispersed by a batch type vertical sand mill for 3 hours. The dispersion by means of the sand mill was performed water-cooled under the conditions including a zirconia bead diameter of 0.3 mm, a filling ratio in a pot of 70% and a circumferential velocity 8 m/s. It was centrifugally treated to remove the coarse particles, and then filtered under pressure by a microfilter (Fuji film, pore size: 3.0 μm) to prepare the pigment dispersion solution 1 containing the pigment at 10 mass %.

The pigment dispersion solution 1 was diluted 4,000 times with pure water, and analyzed for its absorption spectrum by a spectrophotometer (Hitachi, U-3300). It had a Y/X ratio of 0.91, where X is a maximum absorbance in a region of 520 nm or more and 550 nm or less and Y is a maximum absorbance in a region of 550 nm or more and 570 nm or less.

(Preparation of Pigment Dispersion Solution 2 Containing C.I. Pigment Red 122)

10 parts of C.I. Pigment Red 122 as a pigment, 20 parts of a dispersing agent and 70 parts of ion exchange water were mixed and dispersed by a batch type vertical sand mill for 5 hours. The condition of dispersion was the same as described in the preparation of pigment dispersion solution 1 above. It was centrifugally treated to remove the coarse particles, and then filtered under pressure by a microfilter (Fuji film, pore size: 3.0 μm) to prepare the pigment dispersion solution 2 containing the pigment at 10 mass %.

The pigment dispersion solution 2 was diluted 4,000 times with pure water, and analyzed for its absorption spectrum by a spectrophotometer (Hitachi, U-3300). It had a Y/X ratio of 0.96, where X is a maximum absorbance in a region of 520 nm or more and 550 nm or less and Y is a maximum absorbance in a region of 550 nm or more and 570 nm or less.

(Preparation of Pigment Dispersion Solution 3 Containing C.I. Pigment Red 122)

10 parts of C.I. Pigment Red 122 as a pigment, 20 parts of a dispersing agent and 70 parts of ion exchange water were mixed and dispersed by a batch type vertical sand mill for 1 hour. The condition of dispersion was the same as described in the preparation of pigment dispersion solution 1 above. It was centrifugally treated to remove the coarse particles, and then filtered under pressure by a microfilter (Fuji film, pore size: 3.0 μm) to prepare the pigment dispersion solution 3 containing the pigment at 10 mass %.

The pigment dispersion solution 3 was diluted 4,000 times with pure water, and analyzed for its absorption spectrum by a spectrophotometer (Hitachi, U-3300). It had a Y/X ratio of 0.89, where X is a maximum absorbance in a region of 520 nm or more and 550 nm or less and Y is a maximum absorbance in a region of 550 nm or more and 570 nm or less.

(Preparation of Pigment Dispersion Solution 4 Containing C.I. Pigment Red 122)

10 parts of C.I. Pigment Red 122 as a pigment, 20 parts of a dispersing agent and 70 parts of ion exchange water were mixed and dispersed by a batch type vertical sand mill for 3 hours at a circumferential velocity 2 times higher than that for preparation of the pigment dispersion solution 1 and the other condition of dispersion was the same as described in the preparation of pigment dispersion solution 1 above. It was centrifugally treated to remove the coarse particles, and then filtered under pressure by a microfilter (Fuji film, pore size: 3.0 μm) to prepare the pigment dispersion solution 4 containing the pigment at 10 mass %.

The pigment dispersion solution 4 was diluted 4,000 times with pure water, and analyzed for its absorption spectrum by a spectrophotometer (Hitachi, U-3300). It had a Y/X ratio of 1.03, where X is a maximum absorbance in a region of 520 nm or more and 550 nm or less and Y is a maximum absorbance in a region of 550 nm or more and 570 nm or less.

(Preparation of Pigment Dispersion Solution 5 Containing C.I. Pigment Red 149)

10 parts of C.I. Pigment Red 149 as a pigment, 20 parts of a dispersing agent and 70 parts of ion exchange water were mixed and dispersed by a batch type vertical sand mill for 3 hours. The condition of dispersion was the same as described in the preparation of pigment dispersion solution 1 above. It was centrifugally treated to remove the coarse particles, and then filtered under pressure by a microfilter (Fuji film, pore size: 3.0 μm) to prepare the pigment dispersion solution 5 containing the pigment at 10 mass %.

(Preparation of Pigment Dispersion Solution 6 Containing C.I. Pigment Red 177)

10 parts of C.I. Pigment Red 177 as a pigment, 20 parts of a dispersing agent and 70 parts of ion exchange water were mixed and dispersed by a batch type vertical sand mill for 3 hours. The condition of dispersion was the same as described in the preparation of pigment dispersion solution 1 above. It was centrifugally treated to remove the coarse particles, and then filtered under pressure by a microfilter (Fuji film, pore size: 3.0 µm) to prepare the pigment dispersion solution 6 containing the pigment at 10 mass %.

(Preparation of Pigment Dispersion Solution 7 Containing C.I. Pigment Orange 71)

10 parts of C.I. Pigment Orange 71 as a pigment, 20 parts of a dispersing agent and 70 parts of ion exchange water were mixed and dispersed by a batch type vertical sand mill for 3 hours. The condition of dispersion was the same as described in the preparation of pigment dispersion solution 1 above. It was centrifugally treated to remove the coarse particles, and then filtered under pressure by a microfilter (Fuji film, pore size: 3.0 µm) to prepare the pigment dispersion solution 7 containing the pigment at 10 mass %.

(Preparation of Pigment Dispersion Solution 8 Containing C.I. Pigment Violet 19)

10 parts of C.I. Pigment Violet 19 as a pigment, 20 parts of a dispersing agent and 70 parts of ion exchange water were mixed and dispersed by a batch type vertical sand mill for 3 hours. The condition of dispersion was the same as described in the preparation of pigment dispersion solution 1 above. It was centrifugally treated to remove the coarse particles, and then filtered under pressure by a microfilter (Fuji film, pore size: 3.0 µm) to prepare the pigment dispersion solution 8 containing the pigment at 10 mass %.

(Preparation of Pigment Dispersion Solution 9 Containing C.I. Pigment Yellow 74)

10 parts of C.I. Pigment Yellow 74 as a pigment, 20 parts of a dispersing agent and 70 parts of ion exchange water were mixed and dispersed by a batch type vertical sand mill for 3 hours. It was centrifugally treated to remove the coarse particles, and then filtered under pressure by a microfilter (Fuji film, pore size: 3.0 µm) to prepare the pigment dispersion solution 9 containing the pigment at 10 mass %.

(Determination of Whether Each Aqueous Organic Solvent Serves as a Poor Medium or not)

The following test was conducted in order to select the water-soluble organic solvent that acts as a poor medium for the pigment in the above pigment dispersion solution 1. Firstly, the pigment dispersion solution 1 having a pigment concentration of 10 mass % was prepared. This pigment dispersion solution and respective water-soluble organic solvents were used to prepare a poor medium-determination dispersion solution A and a poor medium-determination water dispersion solution B according to the following compositions.

| (Composition of poor medium-determination dispersion solution) | |
| --- | --- |
| [Determination dispersion solution A] | |
| Pigment dispersion solution 1 (pigment concentration of 10 mass %) | 5 parts |
| Water-soluble organic solvent, given in Table 1 | 50 parts |
| Pure water | 45 parts |
| [Determination water dispersion solution B] | |
| Pigment dispersion solution 1 (pigment concentration of 10 mass %) | 5 parts |
| Pure water | 95 parts |

(Determination Method and Results)

Next, 10 g of the respective determination dispersion solution A and determination water dispersion solution B prepared in the manner as described above were placed in a transparent glass sample bottle with caps, respectively. The sample bottles were covered with the caps and sufficiently stirred, followed by settling for 48 hours at 60° C. After that, as measurement samples, the average particle sizes of the pigments in the settled dispersion solutions were measured using a fiber-optics particle analyzer (product name: FPAR-1000; Otsuka Electronics Co., Ltd.). When the average particle size of the pigments in the determination dispersion solution A was larger than the average particle size of the pigments in the determination water dispersion solution B, the water-soluble organic solvent contained in the determination dispersion solution A at that time was determined as a poor medium; whereas when the average particle size of the pigments in the determination dispersion solution A was equal to or smaller than the average particle size of the pigments in the determination water dispersion solution B, the water-soluble organic solvent contained in the determination dispersion solution A at that time was not determined as a poor medium.

Table 1 shows results of the determination on whether the respective water-soluble organic solvents serve as a poor medium or not, which are obtained by measuring the average particle size in the manner as described above. In Table 1, the case where an increase in the particle size was found and the relevant water-soluble organic solvent was determined as a poor medium was indicated by "o" and the case where an increase in the particle size was not found and the relevant water-soluble organic solvent was not determined as a poor medium was indicated by "x".

Determinations were carried out also for the pigment dispersion solutions 2 to 9 to select a water-soluble organic solvent that acts as a poor medium for each pigment in the pigment dispersion solutions 2 to 9, using the same determination method as for the pigment dispersion solution 1. The obtained results are shown in Table 1.

TABLE 1

| | Pigment dispersion solutions | | | | | | | | |
| --- | --- | --- | --- | --- | --- | --- | --- | --- | --- |
| | 1 | 2 | 3 | 4 | 5 | 6 | 7 | 8 | 9 |
| Glycerin | x | x | x | x | x | x | x | x | x |
| 2-pyrrolidone | o | o | o | o | o | o | o | o | o |
| Polyethylene glycol (*1) | o | o | o | o | o | o | o | o | o |

(*1) An average molecular weight of 1,000.

(Preparation of Inks)

Each mixture of the components given in Table 2 was sufficiently stirred and then filtered under pressure by a microfilter (Fuji film, pore size: 1.0 µm) to prepare the inks 1 to 12. Each of the inks was diluted 1,000 times with pure water, and analyzed for its absorption spectrum by a spectrophotometer (Hitachi, U-3300). The maximum absorption wavelengths of these inks are also given in Table 2.

TABLE 2

| | | | \multicolumn{12}{c}{Ink} | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Coloring material | Pigment dispersion solution | 1 | 40.0 | | | 50.0 | | | | | | | | 25.0 |
| | | 2 | | 35.0 | | | | | | | | | | |
| | | 3 | | | | | | | | 70.0 | | | | |
| | | 4 | | | | | | | | | | | 30.0 | |
| | | 5 | | | | | 40.0 | | | | | | | |
| | | 6 | | | | | | 50.0 | | | | | | |
| | | 7 | | | | | | | 40.0 | | | 20.0 | | |
| | | 8 | | | | | | | | | 40.0 | | | |
| | | 9 | | | | | | | | | | 10.0 | | |
| Water-soluble organic solvent | Glycerin | | 9.0 | 9.0 | 9.0 | 9.0 | 9.0 | 9.0 | 9.0 | 9.0 | 9.0 | 9.0 | 9.0 | 9.0 |
| | 2-pyrrolidone | | 6.0 | 6.0 | 6.0 | 6.0 | 6.0 | 6.0 | 6.0 | 6.0 | 6.0 | 6.0 | 6.0 | 6.0 |
| | Polyethylene glycol (*1) | | 5.0 | 5.0 | 5.0 | 5.0 | 5.0 | 5.0 | 5.0 | 5.0 | 5.0 | 5.0 | 5.0 | 5.0 |
| Acetylenol E100 (*2) | | | 0.1 | 0.1 | 0.1 | 0.1 | 0.1 | 0.1 | 0.1 | 0.1 | 0.1 | 0.1 | 0.1 | 0.1 |
| Ion exchange water | | | 39.9 | 44.9 | 39.9 | 29.9 | 39.9 | 29.9 | 39.9 | 9.9 | 59.9 | 69.9 | 49.9 | 54.9 |
| Maximum absorption wavelength (nm) of the ink | | | 540 | 540 | 470 | 540 | 450 | 560 | 520 | 540 | 450 | 440 | 540 | 540 |

(*1) An average molecular weight of 1,000.
(*2) Acetyleneglycol ethylene oxide adduct (surfactant; manufactured by Kawaken Fine Chemicals Co., Ltd.)

(Inks which Constitute an Ink Set)

The inks 1 to 12 were used to prepare the ink sets of Examples 1 to 6 and Comparative Examples 1 to 6. Their combinations are given in Table 3. Absorbance values of the inks which constitute each of the ink sets are summed by the procedure described earlier to find a maximum absorbance A and minimum absorbance B in a region of 450 nm or more and 570 nm or less and also a B/A ratio from these A and B values. Moreover, a WM/WR ratio was also found, where WR is a content of C.I. Pigment Red 149 in the first ink and WM is a content of C.I. Pigment Red 122 in the second ink. The results are given in Table 3.

Then, the liquid storing container was mounted in an ink jet recording apparatus (Canon, BJF-930) which ejects an ink by applying thermal energy to the ink onto a recording medium to form images thereon at a black ink position and photocyan ink position.

A 5 cm square solid image for evaluation was formed using each of the ink sets of Examples 1 to 6 and Comparative Examples 1 to 6, where an ink application amount was changed from 20% duty to 200% duty in an increment of 20% duty. The ink application amount on a recording medium is described below (refer to FIG. 4). For an image formed at an application amount of 200% duty, inks constituting an ink set

TABLE 3

| | | Ink set | | Maximum absorbance A | Maximum absorbance B | | |
|---|---|---|---|---|---|---|---|
| | | First ink | Second ink | (*1) | (*1) | B/A | WM/WR |
| Example | 1 | Ink 3 | Ink 1 | 1.91 | 1.61 | 0.84 | 1.00 |
| | 2 | Ink 5 | Ink 1 | 1.72 | 1.22 | 0.71 | — |
| | 3 | Ink 3 | Ink 2 | 2.05 | 1.76 | 0.86 | 0.88 |
| | 4 | Ink 3 | Ink 4 | 2.08 | 1.48 | 0.71 | 1.25 |
| | 5 | Ink 3 | Ink 8 | 2.10 | 1.49 | 0.71 | 1.75 |
| | 6 | Ink 3 | Ink 11 | 1.98 | 1.66 | 0.84 | 0.75 |
| Comparative Example | 1 | Ink 3 | Ink 7 | 2.72 | 1.88 | 0.69 | — |
| | 2 | Ink 9 | Ink 3 | 2.42 | 0.44 | 0.18 | — |
| | 3 | Ink 10 | Ink 1 | 1.05 | 0.74 | 0.70 | — |
| | 4 | Ink 6 | Ink 7 | 2.40 | 1.00 | 0.42 | — |
| | 5 | Ink 3 | Ink 6 | 2.10 | 1.30 | 0.62 | — |
| | 6 | Ink 3 | Ink 12 | 1.95 | 1.27 | 0.65 | 0.63 |

(*1) Summed absorbance values of the first and second inks in a region of 450 nm or more and 570 nm or less It is noted that the ink 2 which constitutes the ink set of Example 3 has a larger B/A ratio in spite of its lower coloring material content than the ink 1 which constitutes the ink set of Example 1, conceivably because of higher color developability of the pigment dispersion solution 2 contained in the ink 2 than the pigment dispersion solution 1 contained in the ink 1.

(Evaluation)

(Preparation of Images for Evaluation)

Each ink which constitutes each of the ink sets of Examples 1 to 6 and Comparative Examples 1 to 6 was put in a liquid storing container (ink tank) of a structure shown in FIG. 2.

were applied in a ratio of 1:1. For an image at another ink application amount, ink application amount of each ink was changed at intervals of 10% duty.

The output mode and recording media selected for forming the evaluation images are described below:

(Output Mode)
Type of paper: Pro photo Paper
Print quality: Clear
Color control: Automatic
(Recording Medium)
Professional Photo Paper PR-101 (Canon)

Super Photo Paper SG-101 (Canon)

IJ-RC-UF-120 (Canon)

(Evaluation of Color Developability)

Each evaluation image obtained above was measured using Spectrolino manufactured by Gretag Macbeth for the a* and b* values in the CIE-specified ab calorimetric system. The obtained a* and b* values were plotted on an XY coordinate system to find a color space area in an H° range from 0 to 80° and from 330 to 360°. Color developability was evaluated based on the color space area of an evaluation image formed with the ink set in Comparative Example 1 as 100%. The evaluation standards for color developability is as follows. The evaluation results are shown in Table 4.

AA: Color space area is 120% or more based on Comparative Example 1

A: Color space area is 100% or more and less than 120% based on Comparative Example 1

B: Color space area is 90% or more and less than 100% based on Comparative Example 1

C: Color space area is less than 90% based on Comparative Example 1

(Evaluation of Gradation)

Each evaluation image obtained above was visually observed from a distance of around 30 cm from the image to evaluate its gradation relative to that of an evaluation image formed with the ink set prepared in Comparative Example 1. The evaluation standards, for gradation are as follows. The results are shown in Table 4.

A: Tone is superior to that in Comparative Example 1

B: Tone is equivalent to that in Comparative Example 1

C: Tone is inferior to that in Comparative Example 1

TABLE 4

|  |  | Color developability | Gradation |
|---|---|---|---|
| Example | 1 | AA | A |
|  | 2 | A | B |
|  | 3 | AA | A |
|  | 4 | A | B |
|  | 5 | A | B |
|  | 6 | A | B |
| Comparative Example | 1 | — | — |
|  | 2 | C | C |
|  | 3 | C | B |
|  | 4 | B | C |
|  | 5 | B | B |
|  | 6 | B | B |

(Evaluation of Storage Stability)

The inks 1 to 12 prepared above were analyzed for ink viscosity and pigment average particle size. Moreover, each of inks 1 to 12 was placed in a shot bottle and the bottle was sealed and preserved in an oven for 4 weeks at 60° C. Then, the shot bottle was taken out from the oven and ink viscosity and pigment average particle size were measured, to determine changes of these properties before and after the storage at 60° C. The pigment average particle size was determined by ELS-8000 manufactured by Otsuka Electronics Co., Ltd.

The ink 11 was found to increase in change of pigment average particle size at a much higher rate of 20% than the others.

The present invention is applied to, for example, an ink set, ink cartridge and recording unit which can provide printed matters having image with color developability undoubtedly higher than images produced by a conventional pigment ink, and closer to images produced by silver halide photography or output from a laser printer, color developability in particular in a red color region.

This application claims priority from Japanese Patent Application No. 2005-069839 filed on Mar. 11, 2005, which is hereby incorporated by reference herein.

The invention claimed is:

1. An ink set comprising:
   a first ink; and
   a second ink,
   wherein the first ink has a maximum absorption wavelength in a region of 450 nm or more and less than 500 nm,
   wherein the second ink has a maximum absorption wavelength in a region of 500 nm or more and 570 nm or less,
   wherein a B/A ratio is 0.7 or more and 1.0 or less where A is a maximum summed absorbance and B is a minimum summed absorbance of a summed absorption spectrum in a region of 450 nm or more and 570 nm or less, where the summed absorption spectrum is the sum of an absorption spectrum of the first ink and an absorption spectrum of the second ink, and
   wherein the first ink comprises C.I. Pigment Red 149 as a coloring material and the second ink comprises C.I. Pigment Red 122 as a coloring material.

2. The ink set according to claim 1, wherein the second ink has a maximum absorbance X in a region of 520 nm or more and 550 nm or less and a maximum absorbance Y in a region of 550 nm or more and 570 nm or less at a ratio Y/X of 0.9 or more and 1.0 or less.

3. An image forming method comprising:
   forming images at least by a first ink and a second ink,
   wherein the first ink has a maximum absorption wavelength in a region of 450 nm or more and less than 500 nm,
   wherein the second ink has a maximum absorption wavelength in a region of 500 nm or more and 570 nm or less,
   wherein a B/A ratio is 0.7 or more and 1.0 or less where A is a maximum summed absorbance and B is a minimum summed absorbance of a summed absorption spectrum in a region of 450 nm or more and 570 nm or less, where the summed absorption spectrum is the sum of an absorption spectrum of the first ink and an absorption spectrum of the second ink, and
   wherein the first ink comprises C.I. Pigment Red 149 as a coloring material and the second ink comprises C.I. Pigment Red 122 as a coloring material.

4. An ink jet recording method comprising ejecting an ink by an ink jet method to carry out recording on a recording medium, wherein the ink comprises the ink constituting the ink set according to claim 1.

5. An ink cartridge comprising an ink storage portion for storing an ink, wherein the ink comprises the ink constituting the ink set according to claim 1.

6. A recording unit comprising an ink storage portion for storing an ink and a recording head for ejecting an ink, wherein the ink comprises the ink constituting the ink set according to claim 1.

7. The ink set according to claim 1, wherein the following condition is satisfied: $0.88 \leq WM/WR \leq 1.25$, wherein WM is a C.I. Pigment Red 122 content (mass %) in the second ink and WR is a C.I. Pigment Red 149 content (mass %) in the first ink.

* * * * *